United States Patent
Ribas-Corbera et al.

(10) Patent No.: US 6,366,704 B1
(45) Date of Patent: Apr. 2, 2002

(54) METHOD AND APPARATUS FOR A DELAY-ADAPTIVE RATE CONTROL SCHEME FOR THE FRAME LAYER

(75) Inventors: Jordi Ribas-Corbera, Vancouver; Shaw-Min Lei, Camas, both of WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/192,831

(22) Filed: Nov. 16, 1998

Related U.S. Application Data

(60) Provisional application No. 60/067,692, filed on Dec. 1, 1997.

(51) Int. Cl.⁷ .............................. G06K 9/36; H04N 7/12
(52) U.S. Cl. .................... 382/239; 382/236; 375/240.02
(58) Field of Search ................................ 382/232, 239, 382/236, 251, 250; 375/240.04, 240.03, 240.02, 240.01, 240.12, 240.06, 240.24; 709/247; 388/109; 348/384.1

(56) References Cited

U.S. PATENT DOCUMENTS

| | | | |
|---|---|---|---|
| 4,984,076 A | * 1/1991 | Watanabe et al. | 375/240.2 |
| 5,038,209 A | 8/1991 | Hang | 375/240.05 |
| 5,159,447 A | 10/1992 | Haskell et al. | 375/240.05 |
| 5,231,484 A | 7/1993 | Gonzales et al. | 375/240.04 |
| 5,241,383 A | 8/1993 | Chen et al. | 375/240.04 |
| 5,274,443 A | 12/1993 | Dachiku et al. | 375/240.12 |
| 5,283,646 A | 2/1994 | Bruder | 375/240.12 |
| 5,323,187 A | 6/1994 | Park | 375/240.04 |
| 5,426,463 A | 6/1995 | Reininger et al. | 375/240.03 |
| 5,506,686 A | 4/1996 | Auyeung et al. | 358/261.2 |
| 5,532,746 A | 7/1996 | Chang | 375/240.12 |
| 5,550,590 A | 8/1996 | Sakazawa et al. | 348/386.1 |
| 5,617,150 A | 4/1997 | Nam et al. | 348/700 |
| 5,719,986 A | * 2/1998 | Kato et al. | 348/384.1 |
| 5,847,761 A | * 12/1998 | Uz et al. | 375/240.06 |

FOREIGN PATENT DOCUMENTS

| | | | |
|---|---|---|---|
| EP | 0 655 867 A1 | 11/1994 | H04N/7/50 |
| WO | WO 96/04646 | 2/1996 | G10L/5/00 |

OTHER PUBLICATIONS

Video Codec Test Model, TMN5, Telnor Research, Jan. 31, 1995 (13 pages).

MPEG–4 Video Verification Model Version 7.0, Coding of Moving Pictures and Associated Audio Information, Apr. 1997 (title page {p. 1}, table of contents {pp. 3–5}, 3.7 Rate Control section {82–88}).

* cited by examiner

*Primary Examiner*—Wenpeng Chen
(74) *Attorney, Agent, or Firm*—Marger, Johnson & McCollom, P.C.

(57) ABSTRACT

A digital video encoder and method for its operation are disclosed. This encoder comprises a frame-layer rate controller that bases a rate-distortion-optimized target bit assignment $T_j$ on an energy estimate for frame j, an average energy estimate for a group of frames, and the desired overall bit rate. If the encoder uses motion compensation, motion bits used for frame j and an average motion bits estimate for a group of frames may also be used by the frame-layer rate controller. Preferably, the desired delay in the system affects how average estimates are computed by the encoder. The frame-layer rate controller of the video encoder above may also utilize buffer protection logic during target bit assignment. This logic adjusts an initial target bit assignment $T_j$ based on the transmission bit rate and desired delay. A primary benefit of the frame-layer rate controller disclosed herein is its basis in a rate-distortion optimal solution to the frame-layer rate control problem. Additional benefits are provided by the explicit consideration of buffer delay during selection of a target bit assignment: rate control robustness allows one controller to be used in a range of delay situations (or even a varying delay situation); and buffer underflow/overflow can be largely eliminated, even in very low delay implementations.

12 Claims, 6 Drawing Sheets

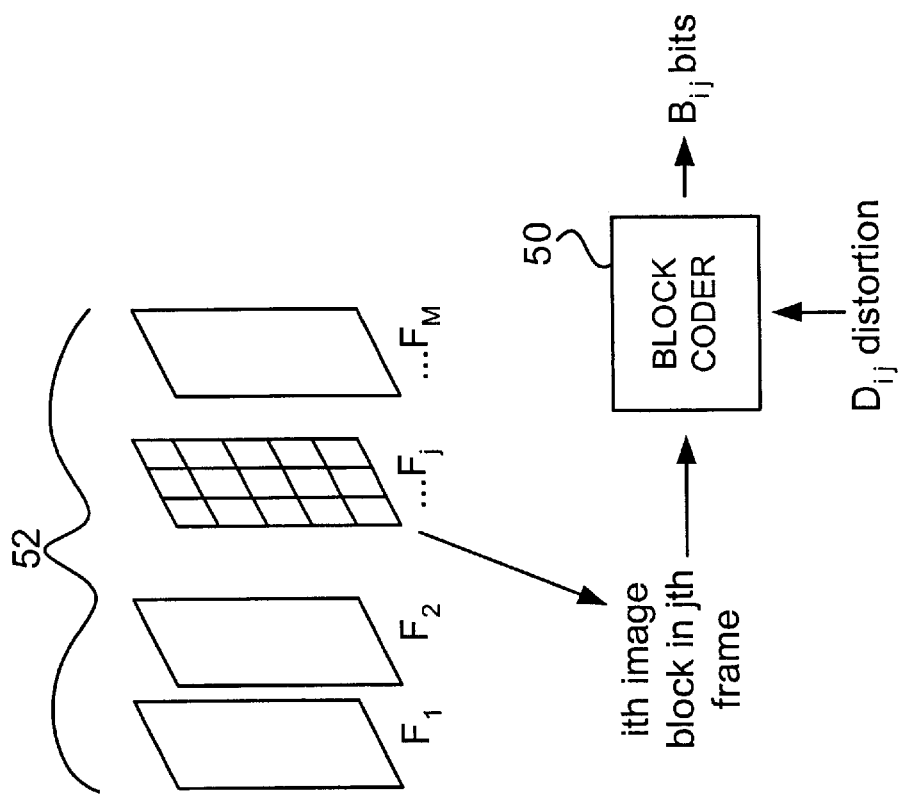
FIG. 4
FIG. 3

METHOD AND APPARATUS FOR A DELAY-ADAPTIVE RATE CONTROL SCHEME FOR THE FRAME LAYER

This application claim benefit to provisional application No. 60/067,692 Dec. 1, 1997.

FIELD OF THE INVENTION

This invention pertains generally to digital video encoders, and more particularly to frame-adaptive bit rate control of such encoders.

BACKGROUND OF THE INVENTION

Uncompressed video requires a relatively high transmission bandwidth. Almost all human-viewable video sequences, however, contain a large amount of redundant and/or visually unimportant information. Digital video allows the use of complex algorithms that remove redundant and relatively unimportant information from a digital video bitstream. With this information removed, video transmission bandwidth may be reduced to acceptable levels. A system that implements video compression algorithms is known as a digital video encoder.

FIG. 1 shows a digital video encoder 36 that employs motion compensation to reduce bandwidth. An image sequence 20, consisting of M frames $F_1, F_2, \ldots F_j, \ldots F_M$, provides the input to encoder 36. Motion compensator 24 is often crucial for effective bandwidth reduction. Motion compensator 24 produces a prediction frame $\tilde{F}_j$ for each input frame $F_j$ by comparing regions of $F_j$ to regions from previously encoded frames for similarity. To be more concrete, given a region in frame $F_j$, the encoder searches for regions in previously encoded frames that are good matches for such region and combines these good matches to form the region's prediction. Thus $\tilde{F}_j$ represents an approximation of $F_j$ based on combinations and/or translations of regions of previously encoded frames. This approximated image can be encoded by merely sending the combination and/or translation instructions, or motion vectors $MV_j$, for frame j.

Before an image $F_j$ is encoded, approximation $\tilde{F}_j$ is subtracted from it in image summer 22. The remaining motion-compensated frame, i.e., the difference image $F_j - \tilde{F}_j$, represents the portion of the input image $F_j$ frame that cannot be easily predicted from previous frames.

The motion-compensated frame is compressed to a target size of approximately T bits by image encoder 26. The motion vectors are likewise compressed in motion encoder 28. When the image sequence is to be transmitted directly to a viewer through channel or interface 34 without intermediate storage (e.g., storage to a disk or other storage media), a buffer 30 is often used to allow the "bursty" encoder outputs to be smoothly transmitted as bitstream 32.

At the receiving end of interface 34, bitstream 32 is received by a video decoder 38. Video decoder 38 often places bitstream 32 in a decoder buffer 47 and then parses bitstream 32 to a motion decoder 42 and an image decoder 40. Image summer 44 combines the output of decoders 40 and 42 to produce an output image sequence 46. Depending on whether image encoder 26 is lossless or lossy, output image sequence 46 may or may not be an exact representation of image sequence 20.

In a digital video encoder 36, and more specifically its embedded image coder 26, it is often preferable to vary the target size T from image frame to image frame. A process that varies T is known as a "frame-layer rate control." A large body of work on frame-layer rate control has been reported in the patent and academic literature [1–14, Appendix A]. Typically, all of these methods decide the target number of bits for a frame using some formula that depends on the energy in that frame, the number of bits used for encoding previous frames, and the current fullness of the encoder buffer 30 (or that of the decoder buffer 47, which is equivalent since both buffers are related).

For example, the frame-layer rate control described in [1] uses a formula for the frame target that depends on the energy of the pixels in the frame and the number of bits used in a previous frame with similar energy. In [13], the energy and previous bits are combined in a different formula to select the target and in [14] such formula depends on the product of quantization values and bits used for a previous frame of the same type. In [3], the frame target depends on a formula that increases in inverse proportion to the fullness of the encoder buffer. Finally, the method in [12] assigns a fixed target number of bits per frame (equal to the channel rate divided by the frame rate) and skips frames when the encoder buffer is close to buffer overflow.

SUMMARY OF THE INVENTION

Even though all frame-layer rate control techniques in the prior art measure similar parameters to determine the target number of bits for a frame [1–14], the formula or method chosen for combining these measurements is the key for an effective bit allocation. Typically, these formulas are ad hoc and are not optimized in a rate-distortion sense and, as a result, they do not minimize image distortion (i.e., maximize image quality) for the available bit rate. Additionally, the desired communication delay, which increases with the size of the encoder buffer, is not taken directly into account when deciding the frame target. At low delay, the latter produces large fluctuations of the fullness level in the encoder buffer that lead to undesired buffer overflow, underflow, and frame skipping.

The present invention provides a frame-layer rate control mechanism that is based on a rate-distortion optimization. And the present invention further teaches modifications to this basic mechanism that allow a digital video encoder rate controller to respond to differences in communication delay. In addition to the benefits of the rate-distortion optimal solution provided by the basic mechanism, these modifications add robustness to a rate controller, such that one controller can be used in a range of delay situations (or even a varying delay situation).

A digital video encoder is disclosed herein. This encoder comprises a frame-layer rate controller that bases a target bit assignment $T_j$ on an energy estimate for frame j, an average energy estimate for a group of frames, and the desired overall bit rate. If the encoder uses motion compensation, motion bits used for frame j and an average motion bits estimate for a group of frames may also be used by the frame-layer rate controller. Preferably, the desired delay in the system affects how average estimates are computed by the encoder.

The rate controller of the video encoder above may also use buffer protection logic during target bit assignment. This logic corrects an initial target bit assignment $T_j$, based on the transmission bit rate, desired delay, and current buffer fullness.

In a further aspect of the invention, methods for combining the parameters and estimates described above are also disclosed. For example, an initial target bit assignment can be computed by multiplying the desired overall average bit assignment by the ratio of the frame energy estimate to the average energy estimate. Preferably, the average energy estimate is calculated by filtering frame energy estimates with a filter having a time constant dependent on the desired system delay.

BRIEF DESCRIPTION OF THE DRAWING

The invention may be best understood by reading the disclosure with reference to the drawing, wherein:

FIG. 3 illustrates the concept of a block coder;

FIGS. 4–6 show suggested delay-adaptive relationships for several parameters of frame-adaptive bit rate control;

DETAILED DESCRIPTION OF THE PREFERRED EMBODIMENTS

Figure 1:
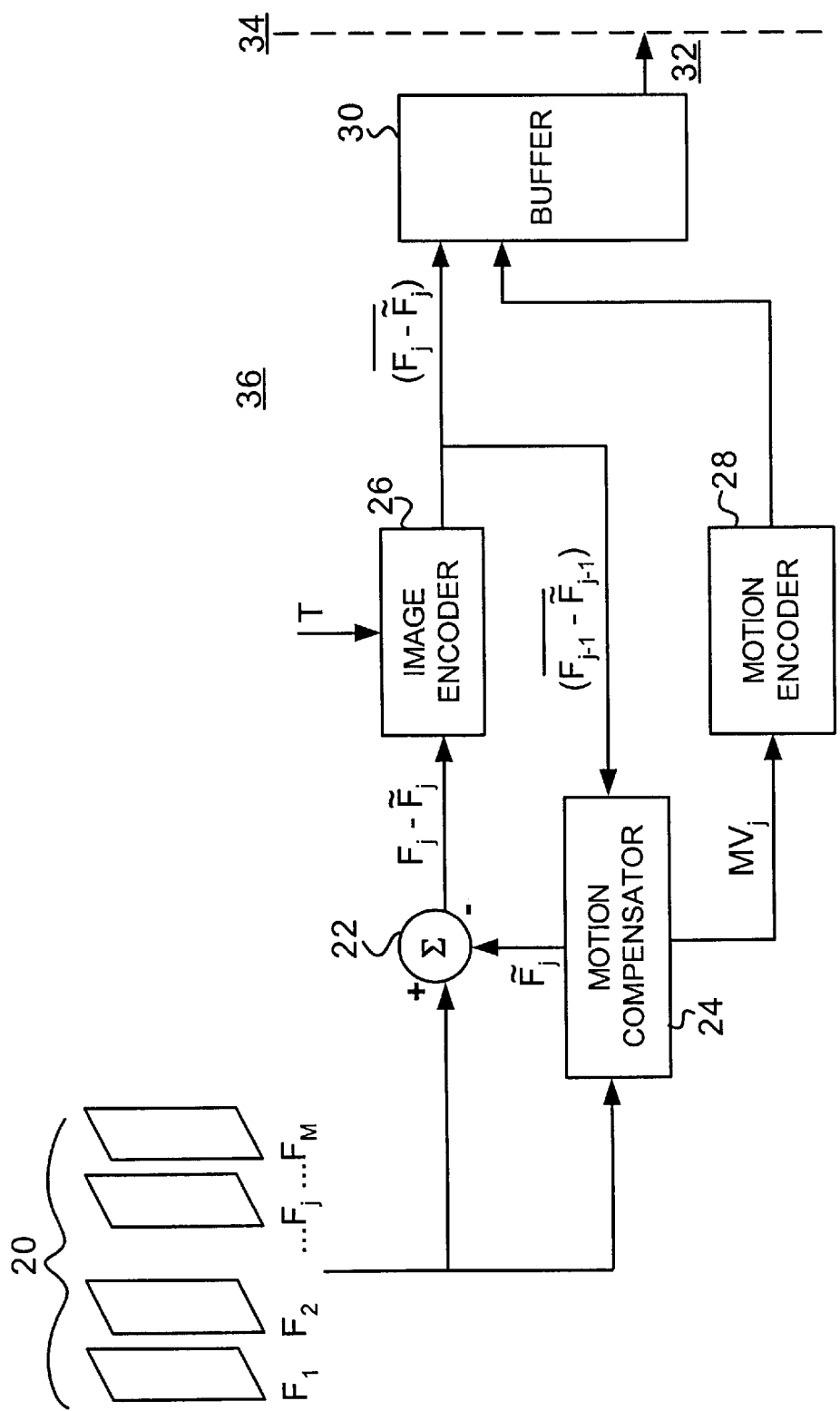
FIG. 1 illustrates a block diagram of a prior art digital video encoder.
Figure 2:
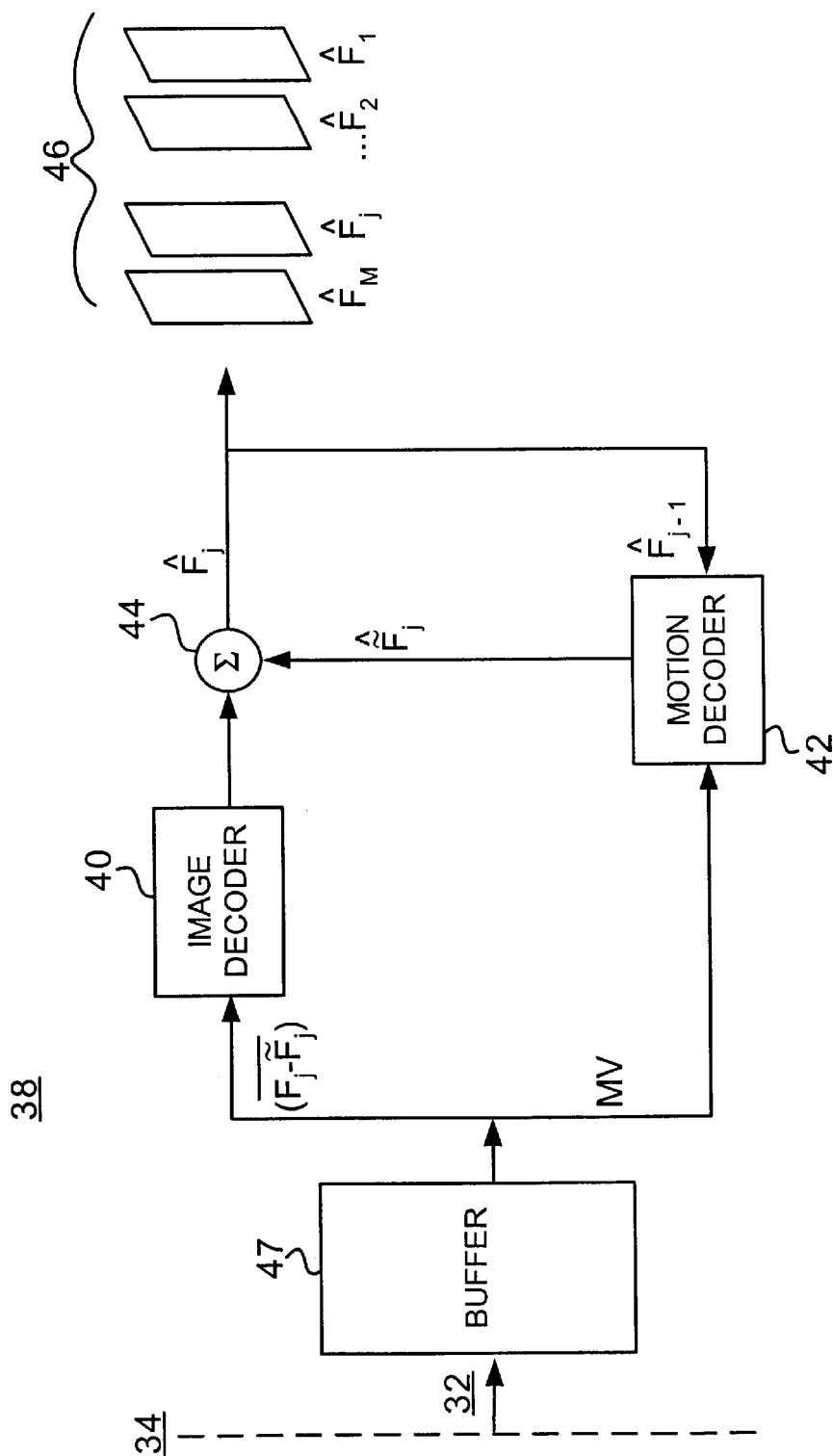
FIG. 2 shows a corresponding block diagram of a prior art digital video decoder.

A typical block-based image coder will be used to describe the following preferred embodiments. The present invention can, however, be used for assigning the target number of bits per frame within any image or video coder.

In block-based image coding, the image to be encoded is decomposed into image blocks of the same size, typically 16×16 pixels per block, and each block is encoded with bits using some coding technique, for example a DCT-based coder. FIG. 3 illustrates the process of encoding the ith block in the jth frame of a video sequence having M frames.

In FIG. 3, $B_{i,j}$ is the number of bits produced when encoding the ith image block in the jth frame and $D_{i,j}$ is the loss in quality or distortion introduced in that block. In many types of block coders, the distortion is controlled by the user with one or several parameters and is typically measured by computing the mean squared error (MSE) between the original and the encoded block. For example, in H.263 and MPEG encoders, the distortion at each image block is controlled by a parameter called the block's quantization step and the MSE distortion is proportional to the square of that parameter. Encoding a block with higher distortion (i.e., lower quality) produces fewer bits for the block. In other words, $B_{i,j}$ decreases with larger $D_{i,j}$. The present invention uses the following mathematical model for the relationship between $B_{i,j}$ and $D_{i,j}$.

Bit-Distortion Model

U.S. patent application Ser. No. 09/008,137, filed Jan. 16, 1998, (now U.S. Pat. No. 6,111,991) by J. Ribas-Corbera and S. Lei, and incorporated herein by reference, discloses an analytical study of typical block-based coders, including formulas for the number of bits produced for a block ($B_{i,j}$) and the MSE distortion in the block ($D_{i,j}$), as a function of several parameters. A combination of these formulas expresses a direct relationship between $B_{i,j}$ and $D_{i,j}$:

$$B_{i,j} = \frac{AK_j}{12} \frac{\alpha_{i,j}^2 \sigma_{i,j}^2}{D_{i,j}} + AC_j, \quad (1)$$

where A is the number of pixels in an image block (e.g., in MPEG and H.263 A=16² pixels), $K_j$ is a parameter that depends on the encoder's coding efficiency and frame pixels' distribution ($K_j$ will not be needed), $C_j$ is the rate (in bits per pixel) of the motion and syntax in the jth frame, and $\sigma_{i,j}^2$ is the variance or energy of the pixels in the block, i.e., $$\sigma_{i,j}^2 = \frac{1}{A} \sum_{l=1}^{A} (P_{i,j}(l) - \bar{P}_{i,j})^2, \quad (2)$$

where A is the number of pixels in a block, $P_{i,j}(l)$ is the value of the l-th pixel in the block, and $\bar{P}_{i,j}$ is the average of the pixel values in the block, $$\bar{P}_{i,j} = \frac{1}{A} \sum_{l=1}^{A} P_{i,j}(l). \quad (3)$$

For color images, the $P_{i,j}(l)$'s are the values of the luminance and chrominance components at the respective pixels. Finally, $\alpha_{i,j}^2$ is a distortion weight chosen by the encoder designer (as described in U.S. patent application Ser. No. 09/008,137) and typically takes values between 1 and $\sigma_{i,j}^2$.

Equation (1) indicates that the number of bits $B_{i,j}$ produced when encoding the ith block (in the jth frame) is inversely proportional to the block's distortion $D_{i,j}$.

The Rate-Distortion Optimization Problem

Let N be the number of image blocks in a frame (with A pixels per block). Then, the total number of image blocks in the video sequence is MN, since there are M frames. We define the overall MSE distortion D as the average of the distortions for all the blocks, i.e., $$D = \frac{1}{MN} \sum_{j=1}^{M} \sum_{i=1}^{N} D_{i,j} = \frac{1}{MN} \sum_{j=1}^{M} \sum_{i=1}^{N} \frac{AK_j}{12} \alpha_{i,j}^2 \frac{\sigma_{i,j}^2}{(B_{i,j} - AC_j)}, \quad (4)$$

using the relationship between $B_{i,j}$ and $D_{i,j}$ from (1). Now, let T be the total number of bits available for the M frames and $T_j$ the number of bits for the jth frame. T is the sum of the bits for the frames or, equivalently, the sum of the bits for all the blocks, i.e., $$T = \sum_{j=1}^{N} T_j = \sum_{j=1}^{M} \sum_{i=1}^{N} B_{i,j}. \quad (5)$$

Our objective is to find the values of the optimal target number of bits for each frame in the sequence, $T_1^*, T_2^*, \ldots$ .., $T_M^*$, that minimize the distortion in (4) subject to the bit budget constraint in (5), i.e., $$T_1^*, T_2^*, \ldots, T_M^* = \operatorname*{argmin}_{\substack{T_1,T_2,\ldots,T_M \\ T=\sum_{j=1}^M T_j}} \quad (9)$$

$$D = \operatorname*{argmin}_{\substack{T_1,T_2,\ldots,T_M \\ T=\sum_{j=1}^M T_j = \sum_{j=1}^M \sum_{i=1}^N B_{i,j}}} \sum_{j=1}^M \sum_{i=1}^N \frac{AK_j}{12} \frac{\alpha_{i,j}^2 \sigma_{i,j}^2}{(B_{i,j} - AC_j)}.$$

Since Equation (6) involves the minimization of a convex function on a convex set, a unique solution to Equation (6) may be found using the method of Lagrange multipliers:

$$T_1^*, T_2^*, \ldots, \quad (7)$$

$$T_M^* = \operatorname*{argmin}_{T_1,T_2,\ldots,T_M} \sum_{j=1}^M \sum_{i=1}^N \frac{AK_j}{12} \alpha_{i,j}^2 \frac{\sigma_{i,j}^2}{(B_{i,j} - AC_j)} + \lambda \left( T - \sum_{j=1}^M \sum_{i=1}^N B_{i,j} \right),$$

where $\lambda$ is the Lagrange multiplier. We solve the minimization problem in Equation (6) by setting partial derivatives of Equation (7) to zero to obtain the following expression for the optimum target number of bits for a frame:

$$T_j^* = \frac{S_j}{\hat{S}} \frac{\left(T - AN \sum_{m=1}^M C_m\right)}{M} + ANC_j, \quad (8)$$

where $S_j$ is the following weighted sum of the standard deviations in the jth frame, $$S_j = \sum_{i=1}^N \alpha_{i,j} \sigma_{i,j}, \quad (9)$$

which can be interpreted as the energy in the jth frame, and $\hat{S}$ is the average of all the frame energies, $$\hat{S} = \frac{1}{M} \sum_{i=1}^M S_j. \quad (10)$$

The formula in Equation (8) is the basis in the invention for assigning a target number of bits to frames of a video sequence. Equation (8) makes sense intuitively. If all the frames have approximately the same energy and motion-syntax overhead, i.e., $$S_1 \approx S_2 \approx \ldots \approx S_j \approx \ldots \approx S_M,$$
$$C_1 \approx C_2 \approx \ldots \approx C_j \approx \ldots \approx C_M,$$

then $T_j^*$ in Equation (8) is approximately T/M, and hence each frame is assigned the same number of bits (recall that T and M are the total number of bits and frames, respectively, for the video sequence). If different frames have different energy and motion activity, those with higher energy and motion (i.e., larger $S_j$ and $C_j$) will be assigned more bits.

In order to compute the value of $\hat{S}$ in Equation (10), the energy in each frame of the M frame-sequence must be computed. This computation would introduce large delays in the encoding process, since it would require the encoder to wait for M frames before encoding the first one ($\hat{S}$ would also be inaccurate without recursion, as frame energy for a frame depends on the target bit rate used for predictive frames). These drawbacks are often not acceptable; preferably then, the encoder estimates $\hat{S}$ with an averaging technique (described in the next section). Similarly, the sum of the $C_j$'s in Equation (8) cannot be known in advance and will also preferably be estimated.

Frame Target Selection

Practical implementations of Equation (8) can take a variety of forms. For example, in MPEG2-type applications Equation (8) could be used for selecting the bit targets in groups of frames (i.e., patterns of I, P, and B frames). In the following embodiment, low-delay type applications, where all frames are predicted from the previous ones, and information for future frames is not available, are considered. The goal in this type of application is to select an adequate target number of bits for the current frame to be encoded.

Based on Equation (8), the following low-delay formula can be used for assigning a target number of bits $T_0$ for the current frame:

$$T_o = \begin{cases} \dfrac{S}{\hat{S}}(B - \hat{V}) + V; & B > \hat{V} \\[6pt] \dfrac{S}{\hat{S}} B; & \text{otherwise} \end{cases} \quad (11)$$

The parameters B, S, $\hat{V}$ and V in Equation (11) correspond to T/M, $S_j$, $AN\Sigma_m C_m/M$, and $ANC_j$ in Equation (8), respectively. The formula in Equation (11) for B>$\hat{V}$ is the same as that in Equation (8). However, $\hat{V}$ is estimated and may be inaccurate at times—when B<$\hat{V}$, the estimate for $\hat{V}$ is too large. In that case, a second estimate $S\hat{V}/\hat{S}=V$ reduces Equation (8) to the simple formula at the bottom of Equation (11). The values of the parameters in Equation (11) can be computed as follows:

B—Average Number of Bits Per Frame

B is the number of bits accepted by the communication channel during a frame interval. Specifically:

$$B = \frac{R}{F}, \quad (12)$$

where R is the channel or target bit rate (in bits per second) and F is the frame rate of the video source (in frames per second). For example, 10 encoded frames per second of digital video at 64 Kilobits per second results in B=6400 bits.

S—Energy of the Current Frame

In this example a frame to be encoded is decomposed into N blocks of a fixed size, e.g., 16×16 pixels per block. S is the sum of the empirical standard deviations of the pixels in the blocks and can be obtained as described in Equation (9). Preferably, $\alpha_{i,j}$ is set to $\sigma_{i,j}$, resulting in the simplification $$S_j = \sum_{i=1}^N \sigma_{i,j}^2.$$

$\hat{S}$—Average Frame Energy $\hat{S}$ is the average energy of the frames in the video sequence as defined in Equation (10). But, as explained earlier, in practice it is often impractical to look ahead to find the value of the energies of future frames and hence the value of Ŝ needs to be estimated. At the first frame, Ŝ=S can be used as the estimate. In the next frames, the value of Ŝ can be updated using a weighted average, e.g., a first-order filtered version of S:

$$\hat{S} = a\hat{S} + (1-a)S, \quad (13)$$

where the weight parameter a is a function of the desired maximum delay d (in seconds) introduced by the encoder buffer; for example:

$$a = \begin{cases} \frac{0.9}{0.5}d; & d < 0.5 \\ 0.9; & \text{otherwise} \end{cases} \quad (14)$$

In this example, when the delay d is below 0.5 seconds, the value of a decreases linearly with d. The formula for a is plotted in FIG. 4.

Typically, the buffer delay d is directly proportional to the size (in bits) of the encoder buffer, Buff, defined herein as Buff=d R.

V—Motion and Syntax Bit Overhead

V is the number of bits spent in motion and syntax for the current frame. This number can be directly measured in some encoders, or can be estimated by the number of motion and syntax bits spent in the previous frame.

V̂—Average Motion and Syntax Bit Overhead

V̂ is the average number of bits per frame used for motion vectors and codec syntax in the video sequence, $$\hat{V} = \frac{1}{M}\sum_{m=1}^{M} V_m, \quad (15)$$

with M the total number of frames and $V_m$ the number of motion and syntax bits used for the m-th frame. However, as in the case of Ŝ, in practice it is often impractical to look ahead to find the value of future $V_m$'s—hence, the value of V̂ needs to be estimated. At the first frame, V̂=V can be used as the estimate. In succeeding frames, the value of V̂ can be updated using the same type of weighted average used for Ŝ in Equation (13):

$$\hat{V} = a\hat{V} + (1-a)V, \quad (16)$$

where the weight parameter a is a function of the desired buffer delay d (in seconds) in the communication system, as described above.

Frame Target Selection for Very Low Delay

The frame target selection system described above reduces the range of values taken by $T_0$ when the user desires lower communication delay. This is because the value of a becomes smaller for lower delay, and hence the values of the estimates Ŝ Equation (13), and V̂, Equation (15) become closer to S and V, respectively. Actually, when the buffer delay d is close to 0, a is also close to 0, and as a result Ŝ≈S and V̂≈V. Consequently, with very low d the frame target Equation (11) is approximately constant and equal to the average channel bits per frame, $$T_o \approx B = \frac{R}{F}, \quad (17)$$

which is the best strategy for frame-layer rate control at very low delay. This is because the number of bits per frame matches those taken by the channel and hence few or no bits are accumulated in the buffer. As a result, the buffer size and delay can be very small.

Buffer Protection

The objective of a buffer protection subsystem is to maintain the number of bits in the buffer close to a desired level. If the buffer fullness is too high or low, the buffer may overflow or underflow, respectively. Also, even if a target number of bits would not overflow or underflow the buffer, typical block-layer rate control schemes do not achieve the target exactly; thus a danger of overflow or underflow still exists. Two separate buffer protection levels, disclosed below, can help protect the buffer from such problems. These levels can be used together (for maximum protection) or independently.

Level 1

In this level, a factor Δ, which depends on the fullness of the encoder buffer, corrects the target number of bits per frame. Specifically, Δ adds to the initial frame target $T_0$, forming the target $T_1$, with level-1 protection, $$T_1 = T_0 + \Delta, \quad (18)$$

where $$\Delta = \begin{cases} -\frac{W}{F}; & W > G \\ \frac{G-W}{F'}; & \text{otherwise} \end{cases} \quad (19)$$

and where:

W—Current number of bits in the encoder buffer

F—Frame rate of the video sequence in frames per second (e.g., 30 fps)

G—Desired number of bits in the encoder buffer.

The goal of Equation (19) is to decrease the frame target if the current number of bits in the buffer, W, is above the goal G, or to decrease it otherwise. The value of G can be selected in terms of the buffer delay d and the buffer size Buff as follows:

$$G = \begin{cases} 0.5\ \text{Buff}; & d > 0.5 \\ d\ \text{Buff}; & 0.1 < d \leq 0.5 \\ 0.1\ \text{Buff}; & d \leq 0.1 \end{cases} \quad (20)$$

Figure 5:
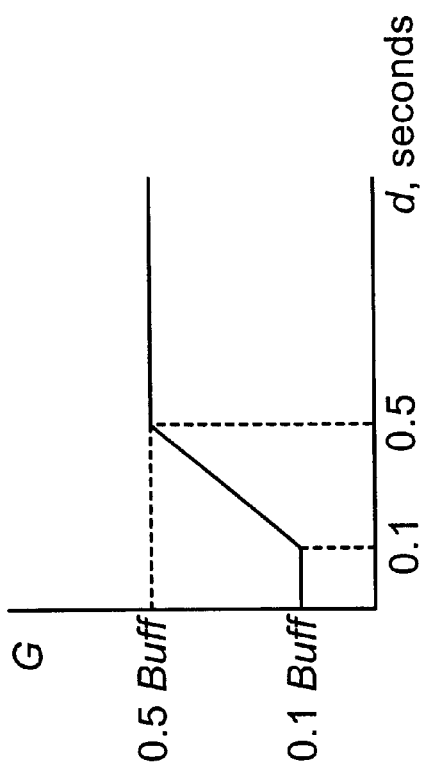

The formula for G indicates that for delays larger than 0.5 seconds, the rate control should aim to keep the buffer fullness at 50 percent, but at lower delays the fullness should be lower (down to 10 percent). This is because when the delay is very small, the buffer size is also very small (recall that Buff=d R), and keeping the buffer fullness to 50 percent may easily produce buffer overflow. The formula for G in Equation (20) is illustrated in FIG. 5.

F'—A parameter that depends on the frame rate F and the delay d, as follows:

$$F' = \begin{cases} F; & d > 0.5 \\ \frac{F-1}{0.4}(d-0.1)+1; & 0.1 < d \le 0.5 \\ 1; & d \le 0.1 \end{cases} \quad (21)$$

Figure 6:
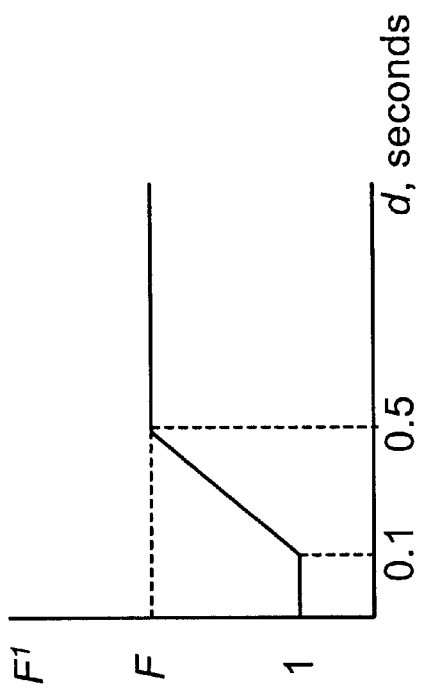

The value of F' is set using Equation (21), which is illustrated in FIG. 6, throughout the video sequence. The rationale in Equation (21) is that when the buffer delay d (or buffer size) is small, since G in Equation (20) is also small, the buffer fullness will be low and there is danger of buffer underflow. To prevent underflow, F' can be made smaller for lower d, which in turn will make the target increase $\Delta$ in Equation (19) larger.

Level 2

The buffer protection at this level is also done before encoding the current frame. This level assumes that $T_1$ bits will be spent for encoding that frame and checks whether that may produce buffer overflow or underflow. To do this, the encoder computes the number of bits expected to be in the buffer after encoding the current frame as follows:

$$W'=\max(W+T_1-B, 0), \quad (22)$$

where W is the current number of bits in the buffer, $T_1$ is the target number of bits for the current frame (with level-1 protection), and B is the number of bits accepted by the communication channel per frame interval. If the current frame occupies $T_1$ bits, the number of bits or fullness of the buffer after encoding this frame will be the current fullness W plus $T_1$ and minus the B bits sent through the channel. If B is larger than $W+T_1$ there is buffer underflow, because the channel accepts more bits than those available in the buffer. In this situation, the max operator in Equation (22) sets the content of the buffer to zero.

To prevent buffer overflow, H Buff is selected to be the desired maximum number of bits in the encoder buffer (the value of H is typically between 0.85 and 0.95—hence, H Buff is 85 to 95 percent of the buffer size). If the expected number of bits in the buffer W', Equation (22) is larger than the desired maximum H Buff, the buffer is almost full and the frame target is decreased to prevent buffer overflow. Conversely, if W' is zero, there will be buffer underflow and the target is increased. This process can be described as follows:

if (W'>H Buff) $T_2$=H Buff−W+B;

else if (W'=0) $T_2$=−W+B;

else $T_2$=$T_1$. (23)

where $T_2$ is the new target number of bits per frame (with level-2 protection) and H is the buffer threshold that can be set to a fixed value, or found using either of the two formulas below:

$$a) \quad H = \begin{cases} 0.95 & R > 112000 \\ \frac{0.1}{0.102}R + \frac{85.7}{102} & 10000 < R \le 112000 \\ 0.85 & R \le 10000 \end{cases} \quad (24)$$

$$b) \quad H = 1 - \frac{p}{Fd}, \quad (25)$$

where R, F, and d are the bit rate, frame rate, and delay, respectively, and p is a number between 0 and 1 (e.g., 0.1).

The rationale behind Equations (24) and (25) is that the buffer threshold H can be larger with larger buffer size Buff, where recall that Buff=R d. H increases with larger R in Equation (24) and larger d in Equation (25). Equation (24) was designed using empirical experiments. Equation (25) was derived by isolating the value of H from the following constraint:

Buff−H Buff=p R/F, (1−H)R d=p R/F, (26)

in which Buff−H Buff is the safety number of bits kept above the desired maximum buffer fullness H Buff, and p R/F is a percentage of the average number of bits per frame. For example, if p=0.1, Equation (25) would select the value of H that would keep 10 percent of the average bits per frame as the safety margin.

Encoder Block Diagram

Figure 7:
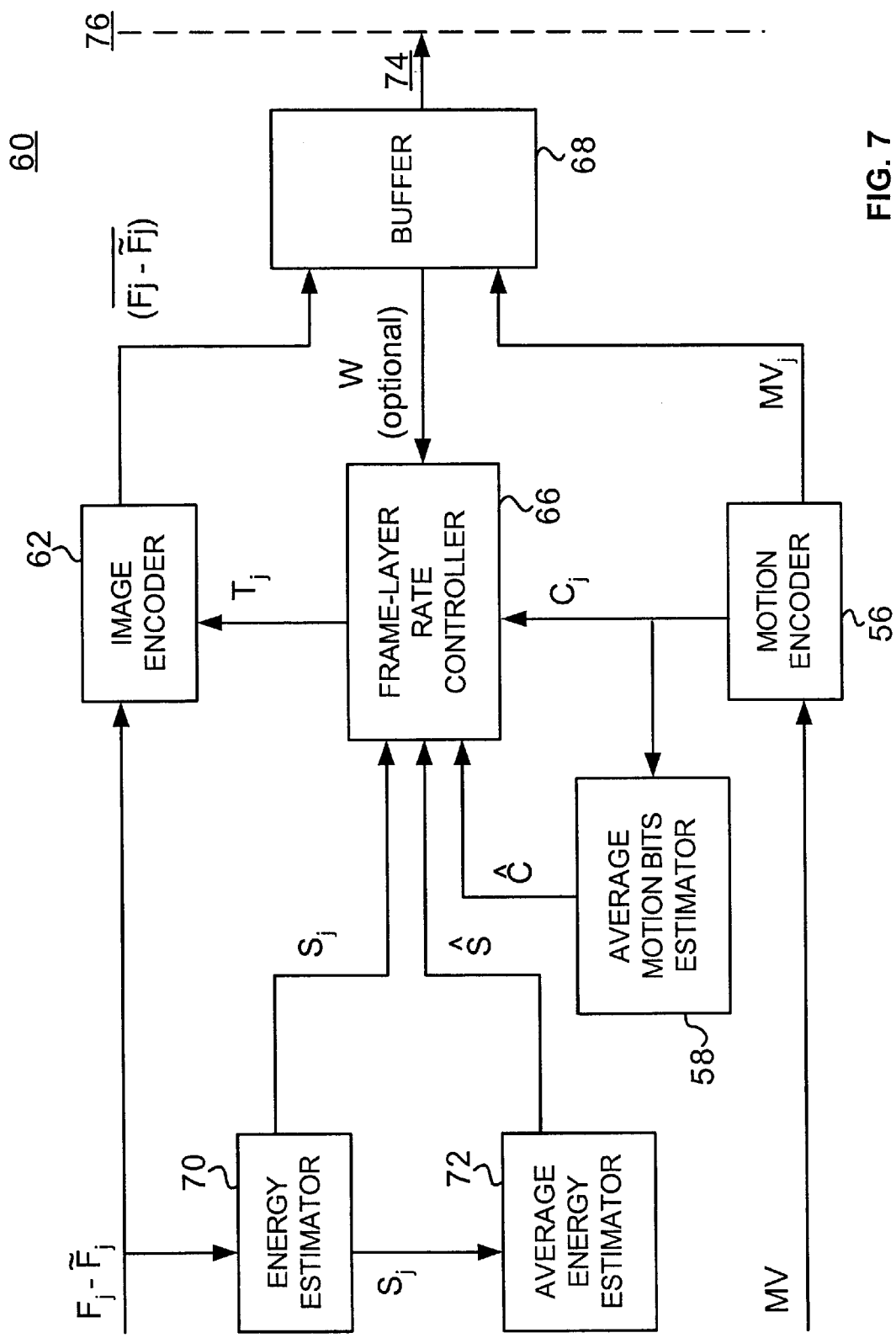
FIG. 7 shows a digital video encoder embodiment of the present invention.

Frame target selection and buffer protection as described above can be implemented in conjunction with any image or video encoder. For generality, FIG. 7 shows a video encoder 60 that includes an image encoder 62, a motion encoder 56, and a buffer 68. The motion compensator 24 and summer 22 of FIG. 1 are not shown to aid clarity, but such would typically exist in encoder 60. Neither motion compensation nor buffering need be present in a specific implementation in order for the invention to be used.

In operation, motion-compensated frames are routed to energy estimator 70. Energy estimator 70 implements, e.g., Equation (9) and routes its output $S_j$ both to frame-layer rate controller 66 and average energy estimator 72. Average energy estimator implements, e.g., Equations (13) and (14), and routes its output $\hat{S}$ to frame-layer rate controller 66. In a basic system, frame-layer rate controller 66 ratios these values and multiplies the result by the desired average bits per frame B to produce target bit rate $T_j$. Image encoder 62 then uses $T_j$ to adjust its compression to the desired target.

In a system employing motion compensation (and more generally, prediction), prediction bit totals can be supplied to frame-layer rate controller 66. Motion encoder 56 sends its count of motion bits for the current frame, $C_j$, both to frame-layer rate controller 66 and average motion bits estimator 58. Average motion bits estimator 58, e.g., implementing Equations (15) and (16), also sends its output $\hat{C}$ to frame-layer rate controller 66. Frame-layer rate controller 66 uses these additional variables, e.g., to form an estimate for $T_j$ as described in equation (11). Note that $T_j$ includes $C_j$; image encoder 62 must comprehend that these $C_j$ bits are not available to it for coding the motion-compensated image.

In a system employing buffer protection, buffer 68 can supply feedback on its current fullness level W to frame-layer rate controller 66. Controller 66 can use, e.g., Level 1 and/or Level 2 buffer protection to adjust $T_j$.

Particular estimates in each estimation block of encoder 60 will generally be application-dependent, although the delay adaptive implementations described herein are preferred.

Experimental Results

The frame target selection and buffer protection of the present invention were implemented in the frame layer of a rate control technique that encoded frames of real video sequences using an MPEG codec. This codec also used the block and data selection layers as described in co-pending U.S. patent application Ser. No. 09/008,137 (now U.S. Pat. No. 6,111,991) incorporated above, and Ser. No. 09/052,882, filed Mar. 31, 1998, by J. Ribas-Corbera and S. Lei, also incorporated herein by reference. The methods described in these two applications were used as block and data selection layers, respectively. The frame layer included the frame target selection system and Level 2 buffer protection (Level 1 buffer protection was also implemented and tested in a different codec). Equation (24) was used to select the value of H. The performance of this method (referred to as SLA rate control) was compared to VM7 rate control, which is a well-known rate control method from Sarnoff Corporation [13].

Table 1 describes the name of the video sequences, format, bit rates and frame rates used in each experiment, and assigns a name to each experiment. All video sequences contained 300 frames and were downsampled at the encoding frame rate specified in the experiments. Overall, 1400 frames were encoded. In the tests, the fullness of the encoder buffer was simulated. Rate control was tested with two different buffers:

Buffer 1: a buffer of size 0.125 times the bit rate of each sequence, Buff=0.125*R, which corresponds to a buffer delay of d=0.125 seconds. This buffer size is often used for low delay video communications.

Buffer 2: a buffer of size 0.05 times the bit rate, Buff=0.050*R, which corresponds to a delay d=0.050. This is a very small buffer size that is not typically used in practice, but was selected here in order to explore the performance of the SLA rate control method in such a challenging case.

Tables 2 and 3 show the percentage of times that the buffers overflow and underflow, respectively, with SLA and VM7 rate control. Buffer overflow is an important problem that forces the encoder to slow down or drop image blocks—preferably, overflow should rarely occur. On the other hand, buffer underflow is less critical, but should also be avoided if possible since it wastes channel bandwidth.

Table 2 shows the percentage of times that the buffer overflows (with respect to the number of frames encoded) when Buffer 1 and Buffer 2 are used with SLA and VM7 rate control. For Buffer 1, SLA rate control controls the bit rate so well that the buffer practically never overflows. In fact, overflow occurred only once in "fmn112_c" (and only a few bits overflowed), which would have barely affected the encoder. For the challenging Buffer 2, the SLA rate control method suffers overflow in only 4 of the 1400 encoded frames—again, only a few bits overflowed in each case. This is particularly impressive, since it is very difficult to control the bit rate fluctuations within such a small buffer. In order to appreciate the benefits of the SLA procedure, observe that overflow is much more common in both buffers with VM7 rate control. Further, with VM7 it was found that the number of bits that overflow is sometimes as large as twice the size of the buffer.

Table 3 shows the percentages of buffer underflow. Observe that SLA rate control underflows the buffers occasionally, but much less often than VM7 rate control. In particular, VM7 rate control underflows the buffer above 80 percent of the time in most of the experiments for Buffer 2.

Overall, SLA rate control is very robust for controlling the bit rate with small buffer sizes and overflows and underflows the buffer much less often than VM7's.

TABLE 1

Description of the video sequences, formats, bit rates and frame rates used in the experiments. Each video sequence contained 300 frames at 30 frames per second and was downsampled at the encoding frame rate. The left-most column shows the name given to each of the experiments.

| Experiment | Video Seq. Name | Format | Bit Rate R (Kbps) | Frames/Second |
|---|---|---|---|---|
| coast112_c | "coastguard" | CIF | 112 | 15 |
| coast112 | "coastguard" | QCIF | 112 | 10 |
| coast48 | "coastguard" | QCIF | 48 | 10 |
| cont24 | "container" | QCIF | 24 | 10 |
| fmn112_c | "foreman" | CIF | 112 | 15 |
| fmn112 | "foreman" | QCIF | 112 | 10 |
| fmn48 | "foreman" | QCIF | 48 | 10 |
| mad10 | "mother &daughter" | QCIF | 10 | 7.5 |
| mad24 | "mother &daughter" | QCIF | 24 | 10 |
| news112_c | "news" | CIF | 112 | 15 |
| news112 | "news" | QCIF | 112 | 10 |
| news48_c | "news" | CIF | 48 | 7.5 |
| sil24 | "silent" | QCIF | 24 | 10 |

TABLE 2

Percentage of times that buffer overflow occurs in an MPEG4 codec using SLA rate control (SLA) and VM7's (VM7) [13].

| | Percentage of Buffer Overflow | | | |
|---|---|---|---|---|
| | Buffer 1 | | Buffer 2 | |
| Name | SLA (%) | VM7 (%) | SLA (%) | VM7 (%) |
| coast112_c | 0 | 6.6 | 0 | 7.3 |
| coast112 | 0 | 0 | 0 | 0 |
| coast48 | 0 | 0 | 0 | 0 |
| cont24 | 0 | 1.0 | 1.0 | 0 |
| fmn112_c | 0.6 | 16.0 | 0.6 | 24.0 |
| fmn112 | 0 | 0 | 1.0 | 0 |
| fmn48 | 0 | 0 | 0 | 5.3 |
| mad10 | 0 | 12.0 | 0 | 14.6 |
| mad24 | 0 | 0 | 0 | 0 |
| news112_c | 0 | 0 | 0 | 0 |
| news112 | 0 | 0 | 0 | 0 |
| news48_c | 0 | 0 | 0 | 2.6 |
| sil24 | 0 | 1.0 | 0 | 0 |

TABLE 3

Percentage of times that buffer underflow occurs in an MPEG4 codec using SLA rate control (SLA) and VM7's (VM7) [13].

| | Percentage of Buffer Underflow | | | |
|---|---|---|---|---|
| | Buffer 1 | | Buffer 2 | |
| Name | SLA (%) | VM7 (%) | SLA (%) | VM7 (%) |
| coast112_c | 0 | 0 | 0 | 55.3 |
| coast112 | 0 | 14.0 | 0 | 99.0 |
| coast48 | 0 | 14.0 | 0 | 99.0 |
| cont24 | 0 | 20.0 | 1.0 | 98.0 |
| fmn112_c | 0 | 0 | 0 | 46.0 |
| fmn112 | 0 | 20.0 | 0 | 99.0 |
| fmn48 | 0 | 20.0 | 0 | 89.0 |

TABLE 3-continued

Percentage of times that buffer underflow occurs in an MPEG4 codec using SLA rate control (SLA) and VM7's (VM7) [13].

| | Percentage of Buffer Underflow | | | |
|---|---|---|---|---|
| | Buffer 1 | | Buffer 2 | |
| Name | SLA (%) | VM7 (%) | SLA (%) | VM7 (%) |
| mad10 | 0 | 37.3 | 0 | 57.3 |
| mad24 | 0 | 41.3 | 3.0 | 96.0 |
| news112_c | 0 | 0 | 0 | 93.3 |
| news112 | 0 | 26.0 | 0 | 99.0 |
| news48_c | 0 | 68.0 | 0 | 85.3 |
| sil24 | 0 | 19.0 | 9.0 | 87.0 |

Alternative Implementations

Several variations on the basic invention are described below.

One-pass

If the computation of the $\sigma_k$'s used for finding $S_j$ in Equation (9) cannot be done in advance, a good estimate for Sj such as the value of S from the previous video frame may be substituted.

Low-complexity Estimation of $\sigma_i$

In order to further reduce computational complexity, the formula for the standard deviation in Equation (2) may be approximated as $$\sigma_{i,j} = \frac{1}{A}\sum_{l=1}^{A} \text{abs}(P_{i,j}(l) - \overline{P}_{i,j}),$$

where abs(x) is the absolute value of x. In video coding, the mean value of pixels in motion-compensated blocks is usually zero and hence this formula may be further simplified by setting $\overline{P}_{i,j}=0$.

Encoding Intra and Inter Blocks

If some of the blocks to be encoded are of class intra and some are inter, as described in U.S. patent application Ser. No. 09/008,137, the performance of the frame target selection method can be improved by dividing the standard deviation of the intra blocks by a factor $\sqrt{\gamma}$. Specifically, after computing the value for the $\sigma_k$'s in Step 1, set:

$$\sigma_k = \begin{cases} \frac{\sigma_k}{\sqrt{\gamma}} & \text{if } k\text{th block is intra} \\ \sigma_k & \text{otherwise} \end{cases}$$

The factor $\gamma$ is $$\gamma = \frac{K_P}{K_I},$$

where $K_I$ and $K_P$ are the averages of the K's from Equation (1) measured for the intra and inter blocks, respectively. The value of $\gamma$ can be estimated and updated during encoding. In practice, a constant $\gamma=3$ works quite well.

Encoding a Group of Pictures (GOP)

In MPEG and H.263+codecs, there are different types of frames:

I frames, whose pixel values are encoded by themselves (or intracoded) without using a prediction from other frames in the video sequence.

P frames, whose pixels are predicted from a previous frame in the video sequence.

B frames, whose pixels are bi-directionally predicted using previous and future frames in the sequence.

A simple variation of equation (8) can be used to assign a target number of bits for each type of frame. For example, consider the typical case where the sequence or pattern of frame types is:

$$I,B,\ldots,B,P,B,\ldots,B,P,B,\ldots,B,P,B,\ldots,B,P,\ldots \quad (27)$$

The set of frames "B, . . . ,B,P" is repeated periodically after the first I frame. In MPEG, such a set (or any other that repeats periodically) is called a group of pictures or GOP.

GOP Type B, . . . ,B,P

Let $N_B$ be the number of B frames in the GOP above. The target number of bits for the P picture in that GOP, $T_P$, and the target for each of the B frames, $T_B$, can be computed from Equation (8) as follows:

$$T_P = \frac{S_P}{\hat{S}}\frac{(T - ANMC_{PB})}{N_B+1} + ANC_P, \quad (28)$$

$$T_B = \frac{S_B}{\hat{S}}\frac{(T - ANMC_{PB})}{N_B+1} + ANC_B, \quad (29)$$

where the parameters in Equations (28) and (29) are equivalent to those in Equation (8). Specifically:

$S_P$ is the energy, Equation (9), for the P frame in the current GOP, which can either be measured or estimated as the average of the energies of P frames in previous GOP's.

$S_B$ is the average of the energies, Equation (9), for the B frames in the current GOP, which again can either be measured or estimated as the average of B frame energy in previous GOP's.

S is the (estimated) average of the energy in the GOP, i.e., $$\hat{S} = \frac{S_P + N_B S_B}{1 + N_B}.$$

$C_P$ and $C_B$ are the motion and syntax rate (in bits per pixel) for the P and B frames, respectively, as defined in Equation (1), and they can also either be measured or estimated. $C_{PB}$ is their average in the GOP, i.e., $$C_{PB} = \frac{C_P + N_B C_B}{1 + N_B}.$$

Finally, T, M, and N are the total number of bits (for the GOP), frames (in the GOP), and macroblocks in a frame.

Equations (28) and (29) may be rearranged in an implementation. For example, after some lengthy but straightforward manipulations, equations (28) and (29) can be rewritten as follows:

$$T_B = \frac{T - AN(C_P - \beta C_B)}{\beta + N_B}, \quad (30)$$

$$T_P = T - N_B T_B, \quad (31)$$

where $$\beta = \frac{S_P}{S_B}.$$

Alternative Formulas for Estimating $\beta$

The value off $\beta$ is the ratio $S_P/S_B$. In Equations (30) and (31), $\beta$ is a key parameter that has strong influence on how many bits are assigned to P and B frames. For example, if $\beta$ is close to 1, the number of bits for each frame in the GOP is similar, i.e., $T_P \approx T_B$, and if $\beta$ is larger than 1, then $T_P$ is also larger than $T_B$. Since $\beta$ is a key parameter, its value must be estimated carefully. Two methods for estimating $\beta$ are presented here:

Method 1:

Set $\beta$ equal to $S_P/S_B$, where $S_P$ is the average of the energies in the M previously encoded P frames and $S_B$ is the average of the energies in the N previously encoded B frames. If available, the energy of the frame that is being encoded could be used as well in the respective average.

Method 2:

After a given frame is encoded, update the value of $\beta$ as follows:

$$\beta = b\beta_{prev} + (1-b)F\frac{S_P}{S_B}, \quad (32)$$

where here $\beta_{prev}$ is the previous value of $\beta$, and $S_P$ and $S_B$ are the energies of the last encoded P and B frames, respectively. F and are b filter or weight parameters. Typically F takes values between 1 and 5, and b between 0.7 and 0.9.

When F is 1, experiments show that the image quality (in terms of MSE) is similar for P and B frames. However, in some cases, the average image quality can be increased by allowing some frames to have better quality than others. For example, increasing F would result in a larger $\beta$, which in turn would increase both $T_P$ and the quality of the P frame. This would appear to reduce the quality of the B frames, since $T_B$ would be smaller. But since the P frame has higher quality and is used to predict the B's by motion compensation, the quality of the B frames could also increase. Using empirical tests, the value of F that optimizes MSE performance decreases with bit rate. This effect can be modeled with the following formula:

$$F = \frac{c}{Bpp^{\psi}} + d, \quad (33)$$

where Bpp is the rate in bits per pixel for the given video sequence, and c, d, and $\psi$ are constant parameters whose value can be set for a given video codec. For example, in an H.263+ encoder, we empirically found that c=1.35, d=−0.4, and $\psi$=0.5, are good choices.

Figure 8:
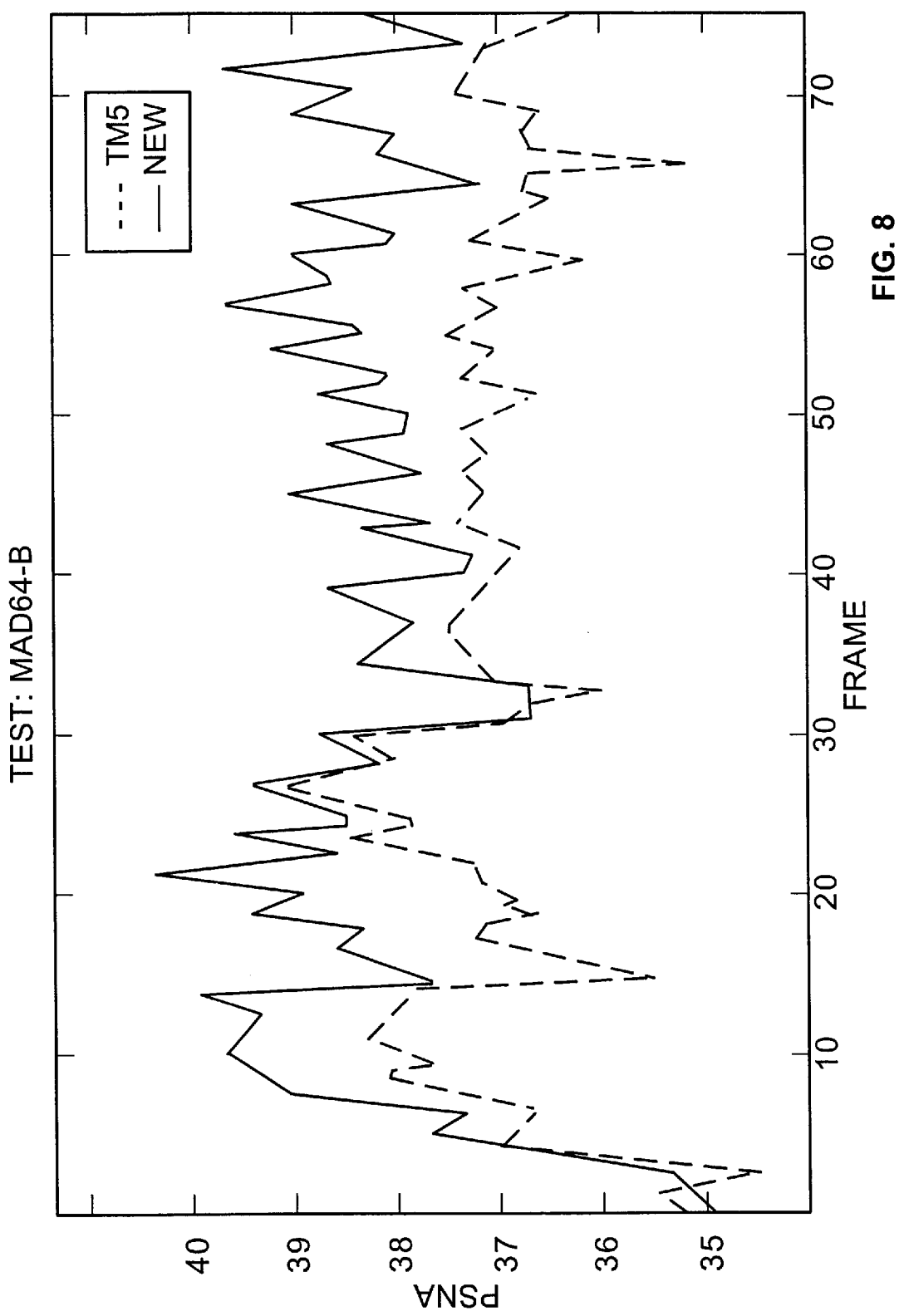
FIG. 8 shows the improvement in image quality in terms of PSNR (peak signal-to-noise ratio) obtained using frame layer rate control according to the present invention, in comparison to the frame layer rate control in [14].

We implemented a frame layer rate control based on Equations (30), (31), (32) and (33), and Thomson's frame layer from [14] in a video encoder compliant to the H.263+ standard. The method in [14] is known as TM5 rate control and is a very popular technique used as a benchmark for comparisons in the rate control literature. For a fair comparison, the rate control at the block layer was the same for both cases. We turned on the advanced prediction, extended motion range, and true B frame options (annexes D, F, and O) in the H.263+ encoder, and selected GOPs with either one ($N_B$=1) or two ($N_B$=2) B frames. The tests are described in Table 4 and the results are in Table 5. FIG. 8 plots the peak signal-to-noise ratio or PSNR per video frame for one of the tests. The PSNR is the typical measure of image quality used in the image and video compression literature and is given in dB's, and a PSNR improvement of 1 dB corresponds to bit rate savings of about 20 percent. Observe that our new frame layer improves the average PSNR up to 1.38 dB with respect to TM5's. Our superior performance is because our frame target formulas are based on a rate-distortion optimization.

TABLE 4

Description of the experiments: names assigned to each experiment, original video sequences, GOP pattern of frames, and target bit rates. The spatial resolution of the video frames was QCIF and the frame rate was of 15 frames per second. The bit rate achieved was very close to the target in all cases. A total of five seconds were encoded for each video sequence.

| Test Name | Video Sequence | GOP pattern of Frames | Bit Rate (Kbps) |
|---|---|---|---|
| Fmn112_a | "foreman" | IBPBP . . . | 112 |
| Fmn112_b | "foreman" | IBBPBBP . . . | 112 |
| Fmn64 | "foreman" | IBPBP . . . | 64 |
| Hall24 | "hall" | IBPBP . . . | 24 |
| Hall48 | "hall" | IBPBP . . . | 48 |
| Hall64_a | "hall" | IBPBP . . . | 64 |
| Hall64_b | "hall" | IBBPBBP . . . | 64 |
| mad24 | "mother & daughter" | IBPBP . . . | 24 |
| mad48 | "mother & daughter" | IBPBP . . . | 48 |
| mad64_a | "mother & daughter" | IBPBP . . . | 64 |
| mad64_b | "mother & daughter" | IBBPBBP . . . | 64 |
| Sil112_a | "silent" | IBPBP . . . | 112 |
| Sil112_b | "silent" | IBBPBBP . . . | 112 |
| Sil48 | "silent" | IBPBP . . . | 48 |

TABLE 5

| | TM5 Frame Layer | | | New Frame Layer | | | |
|---|---|---|---|---|---|---|---|
| Test | PSNR P | PSNR B | PSNR | PSRN P | PSNR B | PSNR | GAIN |
| Fmn112 a | 35.44 | 34.63 | 35.04 | 35.50 | 34.58 | 35.04 | +0.00 |
| Fmn112 b | 35.41 | 34.62 | 34.88 | 35.62 | 34.60 | 34.94 | +0.06 |
| Fmn64 | 32.94 | 32.35 | 32.65 | 33.02 | 32.34 | 32.68 | +0.03 |
| Hall24 | 32.92 | 32.46 | 32.69 | 33.16 | 32.64 | 32.90 | +0.21 |
| Hall48 | 36.01 | 35.40 | 35.70 | 36.64 | 35.37 | 36.00 | +0.30 |

TABLE 5-continued

|  | TM5 Frame Layer | | | New Frame Layer | | | |
| --- | --- | --- | --- | --- | --- | --- | --- |
| Test | PSNR P | PSNR B | PSNR | PSRN P | PSNR B | PSNR | GAIN |
| Hall64 a | 37.13 | 36.78 | 36.96 | 37.99 | 36.58 | 37.29 | +0.33 |
| Hall64 b | 37.02 | 36.67 | 36.79 | 37.94 | 36.73 | 37.14 | +0.35 |
| Mad24 | 34.69 | 34.45 | 34.57 | 34.69 | 34.48 | 34.59 | +0.02 |
| Mad48 | 37.03 | 36.87 | 36.95 | 37.37 | 36.95 | 37.16 | +0.21 |
| Mad64 a | 37.72 | 37.71 | 37.71 | 38.57 | 37.98 | 38.28 | +0.57 |
| Mad64 b | 36.95 | 37.30 | 37.19 | 38.77 | 37.98 | 38.24 | +1.05 |
| Sil112 a | 36.83 | 37.07 | 36.95 | 38.74 | 37.93 | 38.33 | +1.38 |
| Sil112 b | 37.35 | 37.49 | 37.44 | 38.67 | 37.99 | 38.21 | +0.77 |
| Sil48 | 33.52 | 33.05 | 33.28 | 33.80 | 33.19 | 33.50 | +0.22 |

Results of the average PSNR (PSNR) obtained when using our new frame-layer rate control and TM5's [14] for the P (PSNR P) and B (PSNR B) frames. The last column (GAIN) shows the improvement in average PSNR with our new method.

General GOP Type

Observe that equations similar to Equations (28) and (29) can be derived from Equation (8) for any GOP frame pattern. For example, consider a GOP where the number of I, P, and B frames is respectively $N_I$, $N_P$, and $N_B$. Then the target number of bits for each frame type is:

$$T_I = \frac{S_I}{\hat{S}} \frac{(T - ANMC_{IPB})}{N_I + N_P + N_B} + ANC_I, \quad (34)$$

$$T_P = \frac{S_P}{\hat{S}} \frac{(T - ANMC_{IPB})}{N_I + N_P + N_B} + ANC_P, \quad (35)$$

$$T_B = \frac{S_B}{\hat{S}} \frac{(T - ANMC_{IPB})}{N_I + N_P + N_B} + ANC_B, \quad (36)$$

which, once again, after some manipulations, can be re-written as follows:

$$T_I = \frac{(T - ANMC_{IPB})}{N_I + \frac{N_P}{\beta_{IP}} + \frac{N_B}{\beta_{IP}\beta_{PB}}} + ANC_I, \quad (37)$$

$$T_P = \frac{(T - ANMC_{IPB})}{N_I \beta_{IP} + N_P + \frac{N_B}{\beta_{PB}}} + ANC_P, \quad (38)$$

$$T_B = \frac{(T - ANMC_{IPB})}{N_I \beta_{IP} + N_P \beta_{PB} + N_B} + ANC_B. \quad (39)$$

The parameters in Equations (37), (38), and (39) have the same meaning as in previous formulas. For example, $\{C_I, C_P, C_B\}$ are the respective C's for I, P, and B frames, and:

$$C_{IPB} = \frac{N_I C_I + N_P C_P + N_B C_B}{N_I + N_P + N_B}. \quad (40)$$

The values of the β's can be estimated with either Method 1 or 2 above. For example, $$\beta_{IP} = b_{IP}\beta_{IP,prev} + (1 - b_{IP})F_{IP}\frac{S_I}{S_P}, \quad (41)$$

$$\beta_{PB} = b_{PB}\beta_{PB,prev} + (1 - b_{PB})F_{PB}\frac{S_P}{S_B}, \quad (42)$$

where $\{b_{IP}, F_{IP}\}$ and $\{b_{PB}, F_{PB}\}$ are the respective estimator parameters, as in Equation (32).

After reading this disclosure, one of ordinary skill in the art will recognize that many advantageous modifications to the disclosed embodiments are enabled by the concepts taught herein. In particular, estimation of the parameters used in the calculation of a frame target bit allocation is typically a design choice, and practically will be based on encoder structure and block timing. Such obvious modifications are intended to fall within the scope of the invention as claimed.

What is claimed is:

1. A method for allocating, among the image frames in an image frame sequence, the bits available for representing the image frame sequence, said method comprising the steps of:
    defining a desired average frame target bit allocation B for a group of image frames;
    estimating the frame energy $S_i$ of an individual image frame i selected from said group, wherein said step of estimating the frame energy $S_i$ of an individual image frame i comprises computing a weighted sum of the absolute value of pixels in image frame i;
    estimating an average frame energy $\hat{S}$ using individual frame energy estimates for frames in the image frame sequence up to image frame i;
    setting an individual frame target bit allocation $T_i$ for said individual image frame as $$T_i = \frac{S_i}{\hat{S}} B,$$

and wherein for at least some values of i, individual image frame i utilizes a portion of its individual target bit allocation $T_i$ in transmitting overhead bits $V_i$, wherein the individual frame target bit allocation $T_i$ for said individual image frame i compensates for overhead bits $V_i$ by computing the individual frame target bit allocation as $$T_i = \frac{S_i}{\hat{S}}(B - \hat{V}) + V_i,$$

where $\hat{V}$ is obtained by estimating the average overhead bits per image frame for said group.

2. A method for allocating, among the image frames in an image frame sequence, the bits available for representing the image frame sequence, said method comprising the steps of:
    defining a desired average frame target bit allocation B for a group of image frames;

estimating the frame energy $S_i$ of an individual image frame i selected from said group;

estimating an average frame energy $\hat{S}$ using individual frame energy estimates for frames in the image frame sequence up to image frame i, wherein said step of estimating the average frame energy $\hat{S}$ comprises initializing $\hat{S}=S_i$ for a first frame i in said group, and updating $\hat{S}$ on subsequent frames in said group using a first order filter of the form $\hat{S}=a\hat{S}+(1-a)S_i$, where $0.0<a>1.0$;

setting an individual frame target bit allocation $T_i$ for said individual image frame as $$T_i = \frac{S_i}{\hat{S}}B,$$

wherein for at least some values of i, individual image frame i utilizes a portion of its individual target bit allocation $T_i$ in transmitting overhead bits $V_i$, wherein the individual frame target bit allocation $T_i$ for said individual image frame i compensates for overhead bits $V_i$ by computing the individual frame target bit allocation as $$T_i = \frac{S_i}{\hat{S}}(B - \hat{V}) + V_i,$$

where $\hat{V}$ is obtained by estimating the average overhead bits per image frame for said group.

3. The method of claim 2, further comprising the steps of encoding each of said individual image frames and storing each encoded image frame in an encoder buffer for transmission, wherein the value of a is a function of a maximum transmission delay d introduced by the encoder buffer.

4. The method of claim 3, wherein $$a = \begin{cases} \frac{0.9}{0.5}d; & d < 0.5 \\ 0.9; & \text{otherwise} \end{cases}.$$

5. A method for allocating, among the image frames in an image frame sequence, the bits available for representing the image frame sequence, said method comprising the steps of:

defining a desired average frame target bit allocation B for a group of image frames;

estimating the frame energy $S_i$ of an individual image frame i selected from said group;

estimating an average frame energy $\hat{S}$ using individual frame energy estimates for frames in the image frame sequence up to image frame i;

setting an individual frame target bit allocation $T_i$ for said individual image frame as $$T_i = \frac{S_i}{\hat{S}}B,$$

and wherein for at least some values of i, individual image frame i utilizes a portion of its individual target bit allocation $T_i$ in transmitting overhead bits $V_i$, wherein the individual frame target bit allocation $T_i$ for said individual image frame i compensates for overhead bits $V_i$ by computing the individual frame target bit allocation as $$T_i = \frac{S_i}{\hat{S}}(B - \hat{V}) + V_i,$$

where $\hat{V}$ is obtained by estimating the average overhead bits per image frame for said group, and wherein said step of estimating the average overhead bits per image frame $\hat{V}$ comprises initializing $\hat{V}=V_i$ for a first frame i in said group, and updating $\hat{V}$ on subsequent frames in said group using a first order filter of the form $\hat{V}=a\hat{V}+(I-a)V_i$, where $0.0<a<1.0$.

6. The method of claim 5, further comprising the steps of encoding each of said individual image frames and storing each encoded image frame in an encoder buffer for transmission, wherein the value of a is a function of a maximum transmission delay d introduced by the encoder buffer.

7. The method of claim 6, wherein $$a = \begin{cases} \frac{0.9}{0.5}d; & d < 0.5 \\ 0.9; & \text{otherwise} \end{cases}.$$

8. A method for allocating, among the image frames in an image frame sequence, the bits available for representing the image frame sequence, said method comprising the steps of:

defining a desired average frame target bit allocation B for a group of image frames;

estimating the frame energy $S_i$ of an individual image frame i selected from said group;

estimating an average frame energy $\hat{S}$ using individual frame energy estimates for frames in the image frame sequence up to image frame i;

setting an individual frame target bit allocation $T_i$ for said individual image frame as $$T_i = \frac{S_i}{\hat{S}}B,$$

and wherein for at least some values of i, individual image frame i utilizes a portion of its individual target bit allocation $T_i$ in transmitting overhead bits $V_i$, wherein the individual frame target bit allocation $T_i$ for said individual image frame i compensates for overhead bits $V_i$ by computing the individual frame target bit allocation as $$T_i = \frac{S_i}{\hat{S}}(B - \hat{V}) + V_i,$$

where $\hat{V}$ is obtained by estimating the average overhead bits per image frame for said group;

obtaining the current number of bits in an encoder buffer;

comparing the current number of bits in the encoder buffer to a desired number of bits in the encoder buffer, wherein said desired number of bits in the encoder buffer is a function of buffer delay;

computing an individual target bit allocation correction based on the comparing step; and adding the individual target bit allocation correction to the individual frame target bit allocation $T_i$.

9. The method of claim 8, wherein G is the desired number of bits in the encoder buffer, d is a specified buffer delay, and Buff is the size of the encoder buffer, $$G = \begin{cases} 0.5\ Buff; & d > 0.5 \\ d\ Buff; & 0.1 < d \le 0.5 \\ 0.1\ Buff; & d \le 0.1 \end{cases}.$$

10. A digital video encoder comprising:
a frame-layer rate controller;
an image encoder that encodes images in a video sequence based on a target bit assignment supplied by said frame-layer rate controller;
a frame energy estimator that operates on said images to produce frame energy estimates;
an average frame energy estimator that operates on frame energy estimates obtained from the frame energy estimator for previous images in the video sequence to produce average frame energy estimates;
wherein said frame-layer rate controller adjusts said target bit assignment based on a ratio of one of said frame energy estimates to one of said average frame energy estimates; and
a buffer for buffering images encoded by said image encoder for a known average buffer delay, wherein said average frame energy estimator comprises a frame energy estimate filter, said filter having a time constant that is a function of the said buffer delay.

11. The digital video encoder of claim 10, wherein said buffer reports its fullness to said frame-layer rate controller, and wherein said frame-layer rate controller adjusts said target bit assignment based on said fullness to avoid buffer underflow and overflow.

12. A digital video encoder comprising:
a frame-layer rate controller;
an image encoder that encodes images in a video sequence based on a target bit assignment supplied by said frame-layer rate controller;
a frame energy estimator that operates on said images to produce frame energy estimates;
an average frame energy estimator that operates on frame energy estimates obtained from the frame energy estimator for previous images in the video sequence to produce average frame energy estimates;
wherein said frame-layer rate controller adjusts said target bit assignment based on a ratio of one of said frame energy estimates to one of said average frame energy estimates; and
a predictor that computes a prediction vector for a current image based on previously encoded images;
a prediction vector encoder that codes said prediction vector and produces an encoded vector bit size; and
an average prediction vector bit size estimator that operates on said encoded vector bit size to produce an average encoded vector bit size,
wherein said frame-layer rate controller adjusts said target bit assignment for average encoded vector bit size and encoded vector bit size.

* * * * *

UNITED STATES PATENT AND TRADEMARK OFFICE
CERTIFICATE OF CORRECTION

PATENT NO.     : 6,366,704 B1
DATED          : April 2, 2002
INVENTOR(S)    : Ribas-Corbera et al.

It is certified that error appears in the above-identified patent and that said Letters Patent is hereby corrected as shown below:

Column 6,
Line 40, "Hits" should read -- Bits --;

Column 11,
Line 5, "MPEG codec" should read -- MPEG4 codec --;

Column 19,
Line 7, "Ŝ-Si" should read -- Ŝ=Si --;
Line 18, "wherein" should read -- and wherein --;

Column 20,
Line 13, "+(I-a)" should read -- +(1-a) --.

Signed and Sealed this

Twenty-eighth Day of January, 2003

JAMES E. ROGAN
*Director of the United States Patent and Trademark Office*